April 9, 1929.   J. W. WELSH ET AL   1,708,202
METHOD OF MAKING HINGES
Filed July 3, 1922
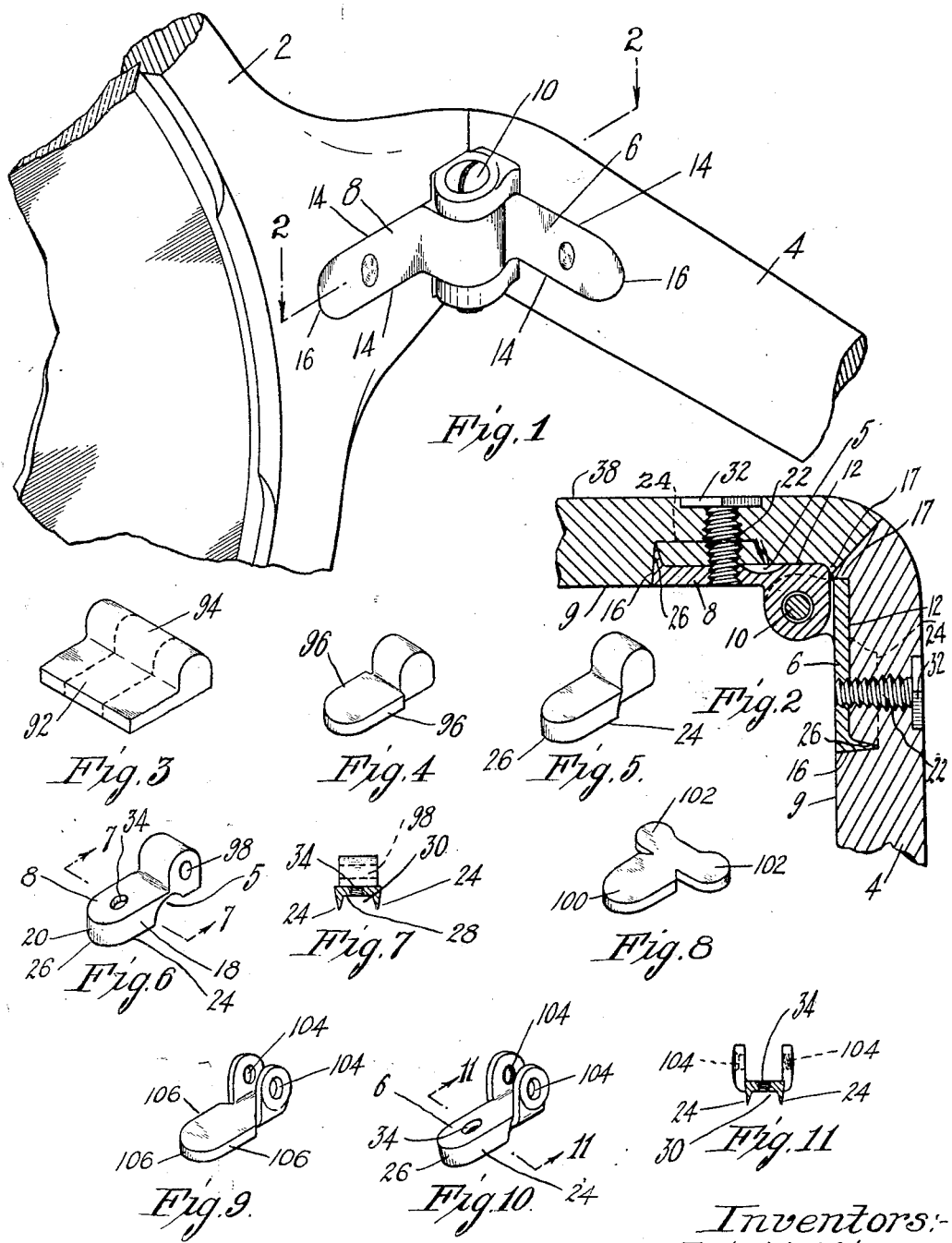
Inventors:-
Frederick A. Stevens
James W. Welsh
By David Rines
Attorney:-

Patented Apr. 9, 1929.

1,708,202

UNITED STATES PATENT OFFICE.

JAMES W. WELSH AND FREDERICK A. STEVENS, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

METHOD OF MAKING HINGES.

Application filed July 3, 1922. Serial No. 572,506.

The present invention relates to methods of manufacturing hinges, and more particularly hinges adapted for use with articles of delicate construction, like ophthalmic mountings.

The object of the invention is to provide an improved hinge of the above-described character which shall be very efficient in operation and cheap to make.

With this end in view, the invention consists of the improved method of making hinges hereinafter described, illustrated in the accompanying drawings and defined in the appended claims.

In the drawings, Fig. 1 is a fragmentary perspective view of an ophthalmic mounting embodying the present invention; Fig. 2 is a section of the same, taken upon the line 2—2 of Fig. 1, looking in the direction of the arrows; Figs. 3, 4, 5 and 6 illustrate successive steps in the manufacture of one of the hinge elements; Fig. 7 is a section taken upon the line 7—7 of Fig. 6, looking in the direction of the arrows; Figs. 8, 9 and 10 illustrate successive steps in the manufacture of the other hinge element; and Fig. 11 is a section taken upon the line 11—11 of Fig. 10, looking in the direction of the arrows.

The invention is for illustrative purposes shown in connection with a spectacle mounting comprising a lens-holding frame member 2 and temple members 4, constituted of plastic, non-metallic material like celluloid, zylonite or other composition. The temples 4 are pivotally connected to the lens-holding frame 2 by hinges comprising hinge plates 6 and 8 that are pivoted together at 10. One face 9 of each of the non-metallic members is recessed, the bottom wall of the recess 12 being substantially flat and the recess being shown provided with longitudinally extending walls 14 that may be straight and parallel, if desired, and that are connected by a transversely extending wall 16. There may be a wall 17 opposed to the wall 16 or the recess may be open-ended, as desired. The hinge plates 6 and 8 are similarly substantially flat and are provided with walls 18 that are connected by a wall 20. The hinge plates and the recesses 12 are so shaped that the hinge plates will fit tightly in the recesses, the hinge plates lying flat against the bottom flat walls of the recesses, with the walls 18 in contact with the walls 14, and the wall 20 in contact with the wall 16. The walls 14, 16, 18 and 20 are made blunt to prevent rotation or twisting of the hinge plates within the recesses 12. The hinge plates are provided with beveled wings 24 along the walls 18 and a beveled wing 26 along the wall 20 connecting the beveled wings 24. The wings 24 and 26 are continuous and offset from the inner face 28 of the hinge plate. The hinge plate, after being fitted into position in the recess 12, is forced home by pressure, causing the beveled wings to bite or wedge into, and become embedded within the non-metallic material. The non-metallic material being plastic, it becomes compressed or wedged into the channel 30, between the wings, effecting a very tight joint. The parts are held together by a single rivet or screw 22, shown screwed into the screw-threaded bore 34 of the hinge plate, and then upset by pressure applied to the opposite ends of the screw. The head 32 of the screw is thus forced into position, flush with the face 38 of the non-metallic member, and the body of the screw is caused to bulge out, Fig. 2, effecting a very tight union of the parts.

The ophthalmic mounting described above constitutes no part of the present invention, and the invention may be embodied as readily in other articles. The essential novelty of the invention resides in the improved method of making the hinge above described.

The hinge plates 8 are made from a metal bar provided with a plate portion 92 and an upstanding portion 94. These bars are cut transversely, as indicated by dotted lines in Fig. 3, and portions are cut away at the sides of the upstanding portion 94 to produce an article such as is shown in Fig. 4. In this article, the width of the plate portion is greater than the width of the upstanding portion, and the margin projects beyond the latter, on both sides thereof, as indicated at 96. The projecting marginal portions 96 are now swaged at right angles to the plane of the plate portion, as illustrated in Fig. 5, to produce the wings 24 and 26, after which the plate portion is provided with the screw-threaded bore 34 and the upstanding portion is drilled at 98. A portion 5 of the hinge plate is reduced in thickness to permit bending the upstanding portion relative to the plate portion, thereby, in the case of ophthalmic mountings, to provide for angularly adjusting the temple 4.

The first step in the manufacture of the hinge plate 6 is to stamp out of sheet metal a blank such as is shown in Fig. 8, having a plate portion 100 and two ear portions 102. The ear portions are drilled at 104 and bent at right angles into the positions shown in Fig. 9. Marginal portions 106 of the plate portion 100 are then swaged, in the same manner as described above in connection with the marginal portions 96, to produce similar wing portions 24 and 26. The hole 34 is then bored, completing the hinge plate 6, as illustrated in Figs. 10 and 11. A pintle 10 passes through the perforations 98 and 104 to connect the hinge plates together.

A very efficient article is thus produced at every small cost.

The invention is not, of course, restricted to the exact embodiment that is illustrated therein, but in capable of modification within the skill of the artisan, all such modifications being considered to be included within the scope of the present invention, as defined in the appended claims.

What is claimed as new is:

1. The method of making a hinge that comprises cutting transversely a bar having a plate portion and an upstanding portion, swaging the margin of the plate portion out of the plane of the plate portion to produce beveled wings, stamping out of a sheet a blank having a plate portion and two ear portions, swaging the margin of the blank plate portion out of the plane of the blank plate portion to produce beveled wings, bending the ear portions at right angles to the blank plate portion, perforating the upstanding portion and the ear portions, and mounting a pintle in the perforations of the upstanding portion and the ear portions.

2. The method of making a hinge element that comprises providing an element having a plate portion and a portion projecting from the plate portion, and swaging the margin of the plate portion out of the plane of the plate portion to produce beveled wings.

3. The method of making a hinge element that comprises providing an element having a body portion and a portion projecting from the body portion, swaging the body portion to produce beveled wings, and attaching the second-named portion to another hinge element.

4. The method of making a hinge that comprises cutting transversely a bar having a plate portion and an upstanding portion, providing a sheet blank having a plate portion and two ear portions, swaging the margin of one of the plate portions out of the plane of the said one plate portion to produce belevel wings, bending the ear portions at right angles to the blank plate portion, perforating the upstanding portion and the ear portions, and mounting a pintle in the perforations of the upstanding portion and the ear portions to hinge the upstanding portion and the ear portions together.

5. The method of making a hinge element that comprises providing an element having a plate-like body portion and a portion projecting from the body portion and by which the hinge element is adapted to be hinged, and swaging a portion of the body portion out of the plane of the plate-like body portion to produce an embedding portion.

In testimony whereof, we have hereunto subscribed our names this 27th day of June, 1922.

JAMES W. WELSH.
FREDERICK A. STEVENS.